United States Patent
Bordere et al.

(10) Patent No.: US 9,415,884 B2
(45) Date of Patent: Aug. 16, 2016

(54) METHOD FOR SAFE FILLING WITH CARBON NANOTUBES, FILLING SYSTEM AND INDUSTRIAL PLANT EMPLOYING THIS METHOD

(71) Applicant: ARKEMA FRANCE, Colombes (FR)

(72) Inventors: Serge Bordere, Jurancon (FR); Patrice Gaillard, Hagetaubin (FR)

(73) Assignee: ARKEMA FRANCE, Columbes (FR)

( * ) Notice: Subject to any disclaimer, the term of this patent is extended or adjusted under 35 U.S.C. 154(b) by 420 days.

(21) Appl. No.: 13/971,179

(22) Filed: Aug. 20, 2013

(65) Prior Publication Data

US 2013/0333802 A1  Dec. 19, 2013

Related U.S. Application Data

(62) Division of application No. 12/361,652, filed on Jan. 29, 2009, now Pat. No. 8,561,652.

(30) Foreign Application Priority Data

Feb. 4, 2008 (FR) ...................................... 08 50674

(51) Int. Cl.
| | |
|---|---|
| *B65B 1/16* | (2006.01) |
| *B65B 1/28* | (2006.01) |
| *B65G 69/18* | (2006.01) |

(52) U.S. Cl.
CPC ... *B65B 1/16* (2013.01); *B65B 1/28* (2013.01); *B65G 69/182* (2013.01); *B65G 69/183* (2013.01); *Y10T 137/87925* (2015.04)

(58) Field of Classification Search
CPC .. B65G 69/183; B82Y 40/00; F16K 27/0218; B65B 1/16; B65B 1/28

USPC ......... 141/192–193, 291–293, 312, 320, 346, 141/360–361; 251/305–308; 137/614, 137/614.06; 977/840
See application file for complete search history.

(56) References Cited

U.S. PATENT DOCUMENTS

| | | | |
|---|---|---|---|
| 3,823,731 A | | 7/1974 | Gordon |
| 5,150,735 A | | 9/1992 | Bandy et al. |
| 5,540,266 A | | 7/1996 | Grau et al. |
| 5,718,270 A | | 2/1998 | Gran et al. |
| 5,775,544 A | | 7/1998 | Semenko |
| 5,853,207 A | | 12/1998 | Saint Martin et al. |
| 5,884,660 A | * | 3/1999 | Cathrein ............... B65B 39/002 137/614.01 |

(Continued)

FOREIGN PATENT DOCUMENTS

| | | |
|---|---|---|
| DE | 44 15 488 | 9/1995 |
| EP | 1468917 | 10/2004 |

OTHER PUBLICATIONS

Koch, M. et al., Flexible Pharma Containment Solutions, Innovations in Pharmaceutical Industry 23, Nov. 2007, pp. 78-81.

(Continued)

*Primary Examiner* — Mark A Laurenzi
*Assistant Examiner* — Timothy P Kelly
(74) *Attorney, Agent, or Firm* — Ratnerprestia

(57) ABSTRACT

The invention relates to a method for filling a receptacle (200) with carbon nanotubes from another receptacle (106) whereby the CNTs are passed from one receptacle to the other by means of a coupling (300) comprising a double-valve device (30), each valve being coupled to one of the receptacles, the valves (31, 32) closing independently and tightly and being openable only when they are coupled to one another.

6 Claims, 4 Drawing Sheets

(56) References Cited

U.S. PATENT DOCUMENTS

| | | |
|---|---|---|
| 6,311,745 B1 | 11/2001 | Welch et al. |
| 6,905,544 B2 | 6/2005 | Setoguchi et al. |
| 7,455,757 B2 | 11/2008 | Oh et al. |
| 8,740,187 B2 * | 6/2014 | Barton .................... F16K 1/223 251/305 |
| 2003/0234174 A1 | 12/2003 | Kinoshita et al. |
| 2010/0126622 A1 | 5/2010 | Koch et al. |
| 2012/0204998 A1 | 8/2012 | Brimson et al. |
| 2015/0027563 A1 * | 1/2015 | Barton .................. F16K 5/0407 137/385 |

OTHER PUBLICATIONS

Untech, G., et al., Zwei Klappen-Ein System, Chemitechnik, Oct. 2005, pp. 51-51.

Nanotechnologieist Experten Nicht Geheuer, Welt Online, Nov. 2007

Aitken, D.K. et al., Carbon Nanotubes: A Review of Their Properties in Relation to Pulmonary Toxicology and Workplace Safety, Toxicol, Sci., 92(1): Jul. 2006, Abstract Only.

Aitken, D.K. et al., Carbon Nanotubes: A Review of Their Properties in Relation to Pulmonary Toxicology and Workplace Safety; Toxicol, Sci., 92(1):5-22 Feb. 2006, Abstract Only.

Bauer, K.H., Behrbuch Der, Wis. Verl. Ges. ISBN 3-8047-1700-4 1999, pp. 304-305.

Arkema France, Safe Handling Guide: Graphistrength Carbon Naotubes Powders, Mar. 2007.

Hersey, J.A. Powder Mixing: Theory and Practive in Pharmacy, Pwesder Technology, 15, 1976, pp. 149-153.

Gerick, H., Dosieren Vo Festsoffen (Schuttgutern), 1989, pp. 94-103.

* cited by examiner

METHOD FOR SAFE FILLING WITH CARBON NANOTUBES, FILLING SYSTEM AND INDUSTRIAL PLANT EMPLOYING THIS METHOD

REFERENCE TO RELATED APPLICATIONS

This application is a divisional of U.S. application Ser. No. 12/361,652, filed on Jan. 29, 2009, which claims priority to FR 08.50674, filed Feb. 4, 2008, the entireties of which applications are incorporated herein by reference.

FIELD OF THE INVENTION

The invention relates to an industrial method for safely filling a receptacle with carbon nanotubes (CNT) from another receptacle. The invention also relates to a filling system employing the method. The invention also relates to a plant for the safe packaging of carbon nanotubes, which is equipped with a filling system according to the invention.

Carbon nanotubes (CNT) are particles of a diameter ranging between 0.4 nm and 50 nm and of a length in excess of 100 times their diameter. CNTs form bundles such that they exist in the form of a powder of a range of particle sizes in which the mean diameter of the particles is about 400 microns.

The expansion in activity relating to CNTs has lead the applicant, in their capacity as a CNT manufacturer, to handle significant quantities of CNT powder and to seek solutions to allow CNTs to be packaged into containers and transported between reactor and storage hopper. However, handling CNTs and designing systems for packaging and transporting them could potentially raise issues of environmental and personal safety, 20 even though to date the risks involved if CNT powder were to be released into the air, even at low doses, are not known.

What has happened is that the applicant has run into difficulties particularly when filling a receptacle with CNTs from another receptacle. Receptacle-filling operations have to be performed once an industrial plant for packaging CNTs into containers has been 25 designed.

What has happened is that the applicant has had to solve the problem of transferring CNTs on an industrial scale without knowing what impact CNTs might have on man and the environment. In order to solve this problem, the applicant has chosen a solution which provides the maximum level of safety with respect to the environment and 30 which is compatible with use on an industrial scale.

In this context, the applicant has chosen to take a precautionary approach and has sought a solution such as to afford a maximum level of safety when transferring CNTs from one receptacle to another receptacle through a mechanical connection positioned between the two receptacles. The applicant has, in particular, sought a solution that affords maximum safety for the operations of filling a CNT packaging receptacle with CNTs from a storage receptacle in a way that is compatible with an industrial process.

In this same approach, the applicant has sought a solution that presents a maximum level of safety throughout an industrial plant developed to transport CNT powder from the reactor in which the CNTs are manufactured as far as the point where they are packaged into containers.

To these ends, the applicant has developed a safe filling method whereby the coupling between a receptacle containing the CNTs and a receptacle intended to receive the CNTs is achieved by means of a safe double-valve device.

A double-valve device provides the tightest possible seal and the highest level of safety with respect to the environment during transfer and also afterwards because those parts of the valves that are exposed to the open air do not become soiled during transfer.

PRIOR ART

Document EP 1 468 917 describes a device for transferring powder, granules, paste, liquid or gas from one container to another container. That transfer device is made up of a cone valve that closes off the opening of one container, of a drive mechanism for moving the cone valve; of a shut-off head positioned on the other container and of a mechanism allowing the head to be moved inside the container under the thrust of the cone valve, this same mechanism ensuring that the shut-off head returns to its initial position when there is no driving thrust.

The cone valve is moved by the drive mechanism of the hydraulic, electrical or pneumatic cylinder type housed in one container.

The head is coupled to the return mechanism housed in the other container.

The drive mechanism that drives the valve is housed inside the container. It is therefore necessary to adapt the container in order to allow this mechanism to be controlled from the outside.

The device described in that document does not deal with the transfer of carbon nanotubes. In any event, that transfer device is unsuited to carbon nanotubes because, being inside the container, the drive mechanism that drives the valve is in contact with the powder that is to be transferred. There is therefore a risk of soiling and of malfunctioning, which risk increases as the powder that is to be transferred becomes more fine, and nanoparticles such as carbon nanotubes are extremely fine.

Further, that device is ill suited to an industrial method for filling with carbon nanotubes because the device entails containers that are specially adapted to take external controls so that the movement of the cone valve can be actuated.

Aside from these disadvantages, the transfer device made up of this type of valve is complex and bulky because it contains a valve drive mechanism and a head return mechanism each moving in the container that houses them and along the longitudinal axis of this container.

SUMMARY OF THE INVENTION

Thus, in order to provide the maximum level of safety for transferring carbon nanotubes and to afford an industrial solution to the transfer of CNTs from one site to another, the applicant has chosen to fit the containers with double-valve devices such as, for example, a device of the "Buck®" or "Glatt®" type. These devices are also known by the name of butterfly valves. These are compact devices in the form of two flat cylindrical elements that are very compact and seal very tightly. Each element constitutes one valve, one being known as the active valve and the other as the passive valve.

Hitherto, double-valve devices of the "Buck®" or "Glatt®" type have been used to handle small volumes of powders of a particle size greater in diameter than CNTs, in pharmaceutical laboratories.

Such devices comprise an active first valve and a passive valve. The opening control is on the periphery of the active valve of the device. The double-valve device can be opened only when the two valves are coupled to one another. The opening control is locked when there is no coupling. The passage between two receptacles connected to one another by this type of valve is opened and closed by shutters that face one another and pivot about a diametral axis under the action of the opening control. The faces of the shutters that are in contact with the products contained in the receptacles are never in contact with the outside. Thus, after the two valves have been disconnected, no product (powder or the like) is present on the external faces of the shutters. This then protects the environment while products are being transferred and even afterwards.

A more particular subject of the invention is an industrial method for filling a receptacle with carbon nanotubes from another receptacle whereby the CNTs are passed from one receptacle to the other by means of a coupling comprising a double-valve device, each of the valves being coupled to one of the receptacles, the said valves closing independently and tightly and being openable only when they are coupled to one another, the said device being a double-valve device of the butterfly valve type.

When the filling method is applied to the metering of CNTs, the CNTs are to transferred from a container to a metering device, and the method then consists in connecting the valve known as the active valve to the container and the other valve known as the passive valve to the metering device.

When the filling method is being applied to the packaging of CNTs in containers from a storage hopper, the method consists in coupling a valve known as the active valve to the outlet line of the hopper and the other valve known as the passive valve to the container.

The invention also relates to an industrial system for filling a receptacle with carbon nanotubes from another receptacle, the system to this end comprising a means of coupling between the two receptacles, comprising a double-valve device, it being possible for a first valve to be coupled to one of the receptacles, it being possible for the other valve to be coupled to the other receptacle, each of the valves closing independently and tightly once they have been fitted to the receptacles, it being possible for the two valves to be coupled to one another, this coupling allowing them to be opened, the said device being a double-valve device of the butterfly valve type.

At least one valve of the double-valve device is active, that is to say that it comprises an opening control. The second valve is a passive valve.

The double-valve device is flat and compact and has shutters that face one another and pivot about a diametral axis under the action of an opening control on the external periphery of the active valve.

The filling system may comprise an adapter to adapt the opening diameter of the container to the diameter of the valve. An adapter may be fixed to the opening of each container to allow coupling with the valves.

The invention applies to any receptacle equipped with a valve of a double-valve device to allow CNTs to be transferred from one receptacle to the other or allow one receptacle to be filled with CNTs from the other.

Receptacles of the storage receptacle type are coupled to the active valve of the double-valve device.

Receptacles in which the CNTs are packaged or other transfer receptacles are coupled to the passive valve of the device, it being possible for this valve to be, for example, connected directly to the opening of the receptacle.

The invention also relates to an industrial plant for packaging CNTs into containers, the said plant being equipped with a carbon nanotubes filling system according to the present invention.

DETAILED DESCRIPTION OF THE INVENTION

Large-scale handling of CNTs has lead the applicant to develop an industrial plant covering the phases from manufacture, that is to say from the reactor in which the CNTs are formed, to the packaging of CNTs in containers, the sizes of which vary from 20 l to 2000 l depending on the anticipated end-use.

The present invention falls into the context of this development and applies to the transfer of CNTs from one receptacle to another when one receptacle needs to be mechanically coupled to another, either directly or via an outlet line, whether this be a packaging receptacle or any other receptacle, for example a metering receptacle.

The description given hereafter illustrates the use of the method according to the invention in two applications and the system used for implementing the method.

Figure 1:
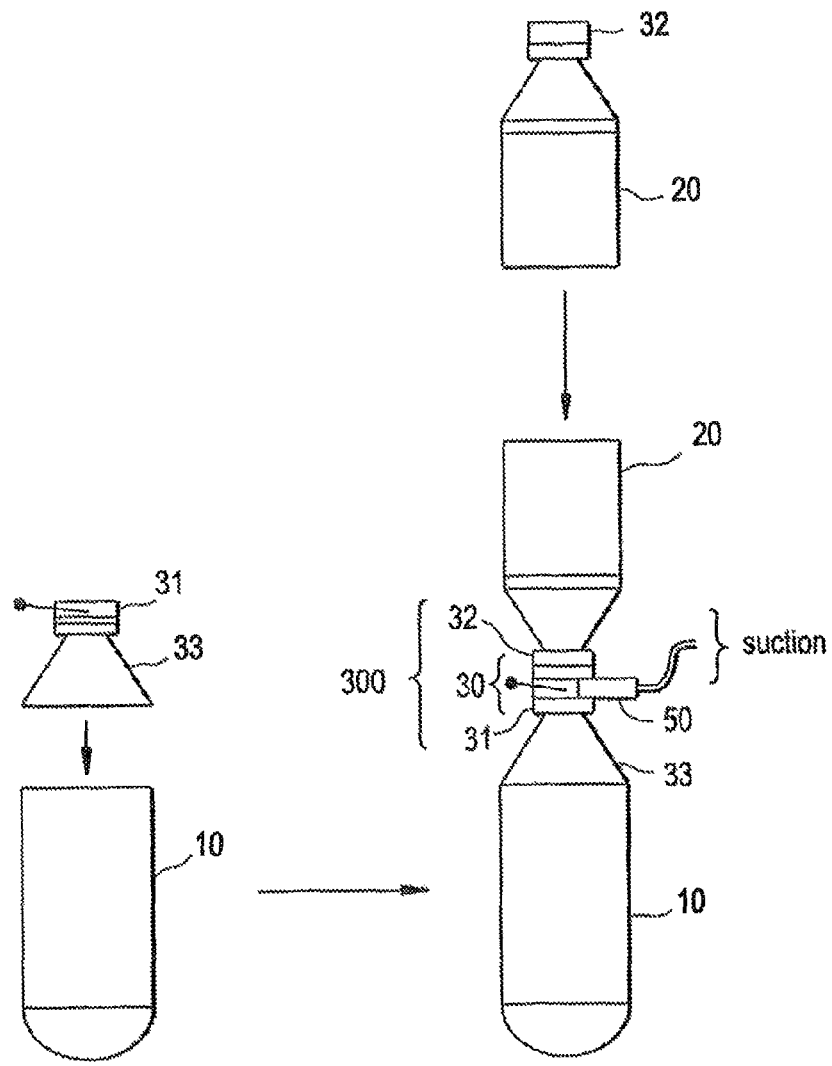
FIG. 1 is a diagram of a CNT filling system for implementing the method in a first application that involves transferring CNTs from a first receptacle to another receptacle.

In a first application illustrated by the diagram that is FIG. 1, the method and the implementation system allow CNTs to be transferred to a receptacle 20 from another receptacle 10 containing CNTs. The receptacle 20 into which the CNTs are transferred, may for example, be a metering device. The receptacle 20 is a storage container.

The coupling 300 between the two receptacles 10, 20 is achieved via the double-valve device 30, a valve 31 and a valve 32 being connected to each opening of the two receptacles.

A suction device 50 coupled to the device 30 may be provided in order to extract any CNT powder residue from the connection.

For transporting the CNTs there is no need to use shuttle containers, that is to say containers the opening of which has the same diameter as that of the double valves. Containers of standard diameter may be used. To do that, the lid of the container is removed. Provision is then made for the transfer device to be fitted with a diameter adapter, referenced 33 in FIG. 1. This is because the diameters of standard containers are greater than those of the double valves. The adapter 33 is cone-shaped such that one of its openings is attached to the container in place of the lid, the other opening being fixed to a valve 31 and/or 32.

The CNT filling method in the case of a second application which is that of packaging CNTs in containers will now be described.

Figure 2:
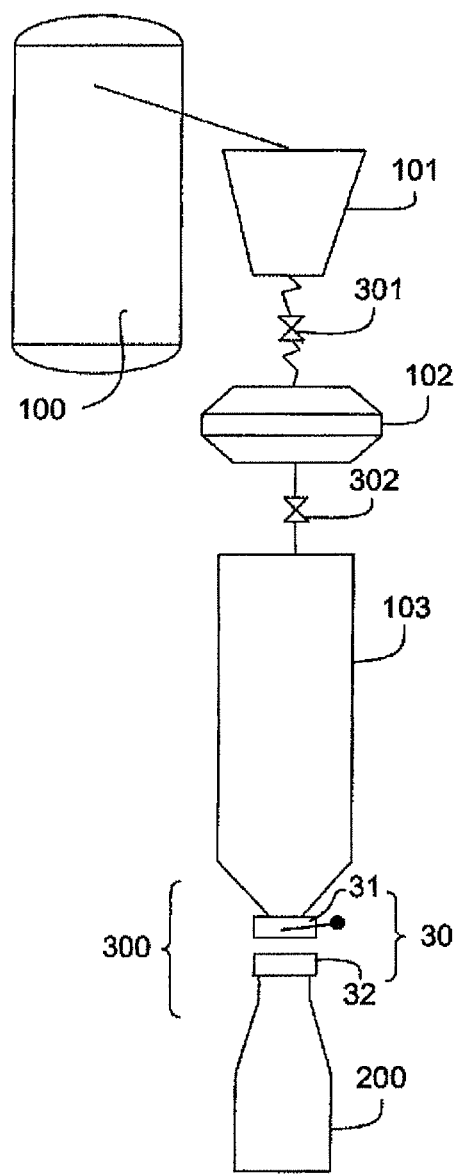
FIG. 2 is a diagram of an industrial plant for packaging CNTs into containers, using a CNT filling system that implements the method.
Figures 3A, 3C:
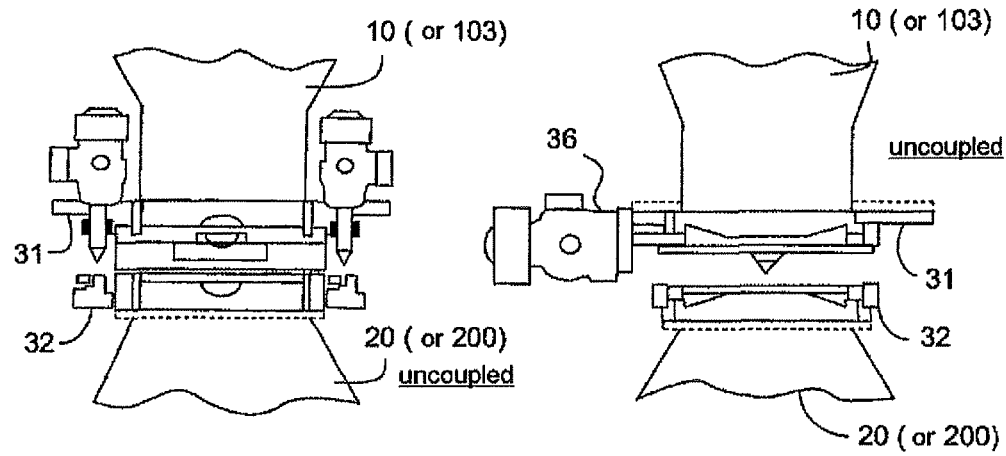
FIGS. 3A and 3B are cross sections on AA of the device 30 of FIGS. 4A and 4B, respectively, in the uncoupled then in the coupled position.
FIGS. 3C and 3D are cross sections on BB of this same device.
Figures 3B, 3D:
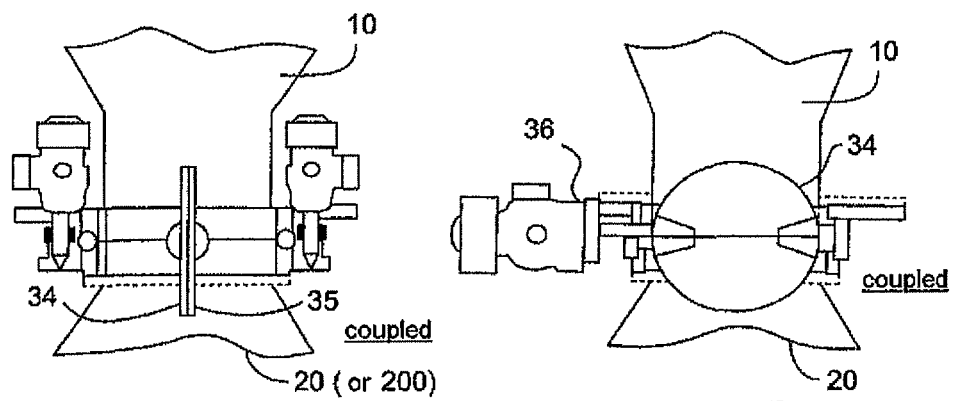
Figures 4A, 4B:
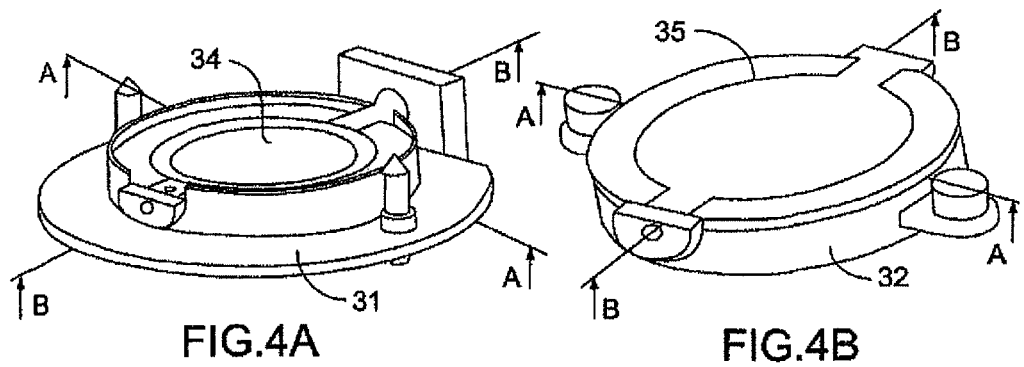
FIGS. 4A and 4B are diagrams of a butterfly-type double-valve device according to an embodiment of the invention.

In a first practical exemplary embodiment illustrated by the diagram that is FIG. 2, packaging is performed without transporting the CNTs, these being transferred from a storage hopper 103 in which the CNT powder is held, into containers 200. The mechanical coupling between the outlet of the hopper 103 and the opening of the container 200 is achieved by means of a double-valve device 30 of the "Buck®" or "Glatt®" butterfly-valve type, marketed by the company of the same name. This device may have an adapter 33 or adapting the diameter fitted to the container 200 if the diameter thereof is not the same as that of the valve 32.

The elements that make up the industrial plant I1 from the reactor 100 as far as the packaging station are:
- a cooler 101
- a screen 102
- a storage hopper 103
- valves 301, 302
- a filling system 300 for packaging, comprising a double-valve device 30.

In order to obtain a very high quality powder with no coke present, the largest particles are removed. To this end, a screen 102 is positioned after the cooler in order to separate out the large particles. This screen 102 must be completely sealed and allow no contact whatever between the operator and the CNT powder, and for example may be a compact screen by the company RITEC. The cut-off of the screen is 2 mm with the screen diameter of 400 mm for a filtration area of 0.1 $m^2$. This tool gives continuous screening of the powder at a high flow rate, the advantage of this equipment being its lateral motors which allow for greater screening performance.

The hopper 103 is coupled to the outlet of the screen. The hopper is preferably pyramid-shaped and made of stainless steel with, in this particular exemplary embodiment, a capacity of 350 l.

The mechanical coupling 300 allows for safe filling between the CNT inlet from the hopper and the opening of the container 200 by virtue of the butterfly-type double-valve device 30.

The CNTs from the hopper 103 may, in an alternative version not depicted in this diagram, pass through a control valve. The active valve 31 of the device 30 would then be coupled to this control valve.

The packaging container 200 is coupled to the passive valve 32 of the device 30.

The butterfly-type double-valve device of the "BUCK" type for example makes it possible to avoid any contact between the powder and the outside, and the CNT powder can thus be transferred in complete safety. By virtue of the technology of this type of valve, the way in which the CNT powder is transferred is highly contained and free of dust. The design of this valve prevents any possibility of the CNT powder leaking to and contaminating the outside.

In this example, the passive valve 32 of the device is connected to the opening of the packaging containers 200 while the active valve 31 is connected to the outlet of the storage hopper.

Reference may be made to the diagrams that are FIGS. 3A to 3D and 4A and 4B in order to understand how the double-valve device described hereinafter works.

When the passive valve 32 on a receptacle 20 or container 200 is coupled to the active valve 31 receiving the CNTs from another receptacle 10 (FIG. 1) or from the hopper 103 (FIG. 2), the two external faces of the shutters 34 and 35 of the valves are pressed together, preventing any CNT powder from soiling these faces. Thus, when the valves 31, 32 are separated, the faces of the shutters 34, 35 find themselves in contact with the outside but have not been soiled with the powder. Further, the coupling of the two valves 31, 32 unlocks the opening control 36 and the shutters can then pivot under the action of the control. The control may be automatic or manual.

The opening of the double valve then allows CNT powder to flow without any external leak.

Figure 5:
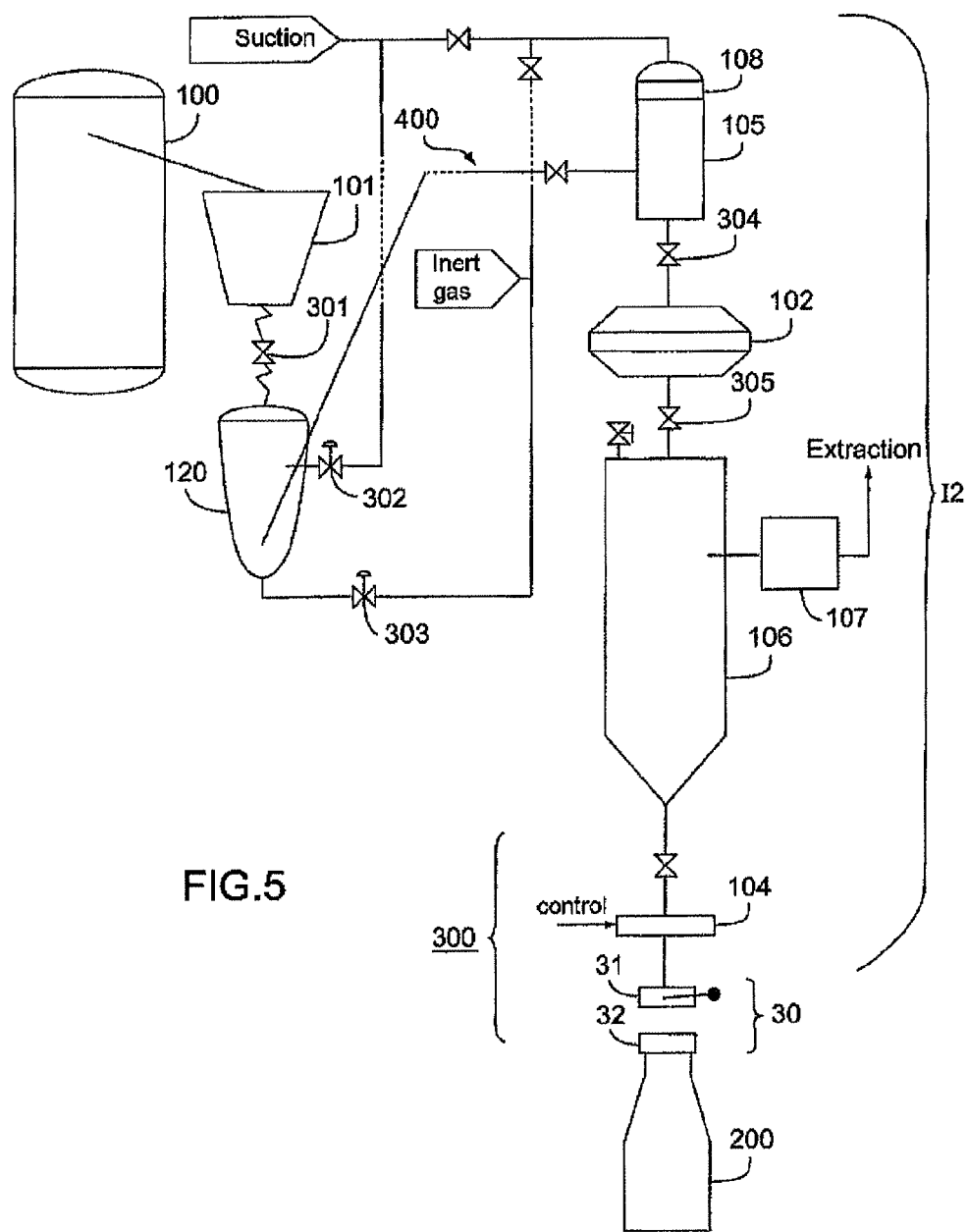
FIG. 5 is a diagram of an industrial plant for packaging CNTs with a pneumatic conveyor line between the reactor 100 and the packaging stage.

In a second example illustrated by the diagram that is FIG. 5, packaging is performed after transport. In this case, the plant I2 comprises a circuit conveying the CNTs from the reactor 100 in which they were manufactured to a remote storage hopper 106 (for example one situated in another building or on a different floor).

The type of transport chosen is pneumatic conveying in the dense phase in order to preserve the quality of the CNT powder and avoid the generation of fine particles. The gas used is air.

In order to make the transportation completely safe, an operation has been chosen in which there is a vacuum in the circuit such that, in the event of a leak, no CNT powder can be discharged into the atmosphere.

The elements that make up the industrial plant from the reactor 100 as far as the packaging stage are:
- a reactor (100) in which the CNTs are formed,
- a cooler (101),
- an airlock (120),
- a pneumatic conveyor (400),
- a vacuum chamber (105) with air filtration (108),
- an in-line screen (102),
- the storage hopper (106),
- a metering valve (104),
- an air filter (107),
- a filling system 300 for packaging using a butterfly-type double-valve device (device with safety valves).

The airlock 120 allows CNT powder produced by the reactor 100 to be recovered and this powder to be inerted by alternating vacuum with nitrogen in order to eliminate any trace of ethylene and, above all, of hydrogen, before pneumatic conveying is performed.

This airlock 120 may also be fitted with a pressurizer so that it can, if appropriate, operate with blowback.

The presence of hydrogen may prove hazardous in the event of leakage and contact with the air. The carbon nanotubes will not be transported until an in-line analyser positioned at the exit of the air lock 120 (before the CNTs are transported) has checked the ethylene concentration. It will be assumed that if no further ethylene is present then the hydrogen will also have disappeared.

In order to obtain a very high quality powder with no coke present, the largest particles are eliminated. To do this, an in-line screen 102 is positioned in the transport circuit 400 after the vacuum chamber 105 in order to separate out the large particles. This screen 102 must be completely sealed and allow no contact whatever between the operator and the CNT powder, and for example may be a compact screen by the company RITEC. The cut-off of the screen is 2 mm with a screen diameter of 400 mm for a filtration area of 0.1 $m^2$. This tool gives continuous screening of the powder at a high flow rate, the advantage of this equipment being the result of the lateral motors which allow for greater screening performance.

The hopper 106 is preferably pyramid-shaped and made of stainless steel with, in this particular exemplary embodiment, a capacity of 350 l.

A weighing device, not depicted, may make it possible at any moment to determine the amount of CNTs produced in the reactor 100.

The air conveyed with the CNT powder is sent to an air filtration device 107 equipped with very high efficiency filters such as HEPA filters H14. An HEPA filter has the ability to retain particles of a diameter of 0.3 µm in the air with an efficiency of 99.995%.

The filling system for packaging CNTs offers the possibility of providing various different volumes (small volumes 1l to 10l, big volumes 60l to 200l until 1 $m^3$ (in weight from 100 g to 100 kg and more)) of carbon nanotubes and of operating in complete safety without handling the powder.

The mechanical coupling 300 between the inlet of CNTs from the hopper and the opening of the container is achieved by means of a butterfly-type double-valve device 30 (of the "Buck®" or "Glatt®" type).

The CNTs from the hopper pass first of all through the control valve 104. The active valve 31 of the device 30 is coupled to this control valve 104.

With a view to avoiding excessive bulk, the control valve 104 comprises a metering device of the DOSIMAT© type. This valve has a cross section DN 150 and consists of a circular disc set in motion by a cylinder which, when pivoting about an axis, opens the way to a greater or lesser flow of product through a crescent-shaped opening that can vary from being completely closed to wide open.

Provision may also be made for the receiving container to be emptied after transport into a receiving hopper with which the plant that will use the CNTs is equipped. When this is the case, the receiving hopper is fitted with an active valve in order to allow the transfer to be performed in complete safety.

The industrial plant that has just been described allows CNT powder to be packaged in complete safety, this safety being afforded at the time of packaging into containers and also throughout the transport line from the reactor as far as the safe coupling device 30.

What is claimed:

1. An industrial packaging plant, comprising:
   a system for filling a second receptacle with carbon nanotubes from a first receptacle, said system comprising the first and second receptacles and a means of coupling the first and second receptacles comprising a double-valve device comprising a first valve, of the butterfly valve type, and a second valve, of the butterfly valve type, said first valve removably coupled to said first receptacle and said second valve removably coupled to said second receptacle, each of the valves closing independently and tightly upon coupling to said first and second receptacles, wherein said first valve and said second valve are openable only when coupled together and said valves operate in tandem when coupled and being opened,
   a reactor in which carbon nanotubes (CNTs) are formed,
   a cooler connected to the reactor,
   an airlock to recover the carbon nanotubes from the reactor and be inerted,
   a pneumatic conveyor connecting the airlock to a vacuum chamber with air filtration,
   an in-line screen positioned after the vacuum chamber to separate out large particles,
   a storage hopper coupled to an outlet of the in-line screen,
   a metering valve positioned between the storage hopper and the double-valve device, and
   an air filter for filtering air conveyed with the carbon nanotubes.

2. The industrial packaging plant according to claim 1, wherein said first valve of the double-valve device is an active valve, comprising an opening control, and said second valve is a passive valve.

3. The industrial packaging plant according to claim 2, wherein said double-valve device is flat and compact and has shutters that face one another and pivot about a diametral axis under the action of means for opening said double-valve device mounted on the external periphery of said active valve.

4. The industrial packaging plant according to claim 1, further comprising an adapter to adapt a diameter of the first receptacle to a diameter of the double-valve device.

5. The industrial packaging plant according to claim 1, wherein said first receptacle comprises a carbon nanotube storage receptacle coupled to said first valve of said double-valve device.

6. The industrial packaging plant according to claim 1, wherein said second receptacle comprises a package for carbon nanotubes coupled to said second valve of said double-valve device.

* * * * *